2,696,455
Patented Dec. 7, 1954

2,696,455

CADMIUM COMPOSITIONS FOR ROUNDWORM CONTROL AND PROCESS OF ADMINISTRATION

Harry E. Blair, Brownsburg, Ind., assignor to Pemco Products, Inc., Indianapolis, Ind., a corporation of Indiana No Drawing. Application May 19, 1952,
Serial No. 288,771

10 Claims. (Cl. 167—53)

The present invention relates to the control of large roundworm infections of poultry and domestic animals. More particularly, it relates to veterinary therapeutic agents for the control of large roundworm infections of poultry and domestic animals comprising an orally ingestible, non-toxic substance having dispersed therein, as an active ingredient, a cadmium compound. Still more particularly, it relates to a poultry or domestic animal feed containing a minor proportion of a cadmium compound wherein the cadmium concentration represents at least 0.003% of the total composition.

Poultry and domestic animals are particularly susceptible to infections with helminths of the Ascarididae family, commonly referred to as large roundworms. Poultry and domestic animals infected with large roundworms are not thrifty, and the infections result in the loss of many thousands of dollars to the producers each year. Accordingly, it is desirable that cheap and effective agents be made available. In many cases, the act of physically restraining and dosing disturbs the patient and may result in injury. It is extremely desirable, therefore, that therapeutic agents for roundworm be provided which are effective when dispersed in poultry or animal feed.

In accordance with the present invention, I have discovered that large roundworm infections of poultry and domestic animals can be effectively controlled by feeding an orally ingestible, non-toxic substance having dispersed therein as the active ingredient, a cadmium compound.

It is an advantage of my invention that my medicated feed compositions, containing as an active ingredient a cadmium compound, are especially well adapted for flock or herd treatment.

An outstanding advantage of my invention is that medicated feed compositions suitable for flock treatment of large roundworm infections of poultry are provided.

An additional outstanding advantage of the present invention is that a medicated feed composition, effective for herd treatment of swine infected with large roundworms is provided.

An additional advantage of this invention is the provision of a medicated horse feed effective in the control of large roundworms.

In carrying out the present invention, a cadmium compound is thoroughly mixed with an orally ingestible, non-toxic substance by methods well known to the art. For example, a powdered form of the desired cadmium compound is mixed with a substance, such as a commercial poultry mash, and the mixture milled until a uniform product is obtained. In other cases, the cadmium compound will be dissolved in water or an organic solvent, and the solution sprayed onto, or otherwise mixed with, a feed substance such as, for example, finely-ground corn meal, and after thorough mixing, the product is dried to remove the solvent.

In my preferred concentrated compositions, I include a non-toxic coloring material. The orally ingestible, non-toxic substance containing a relatively high percentage of a cadmium compound and a colored material can then be mixed with a poultry or domestic animal feed to provide a diluted cadmium-containing feed. When the feed mixture acquires a uniform color, the operator is assured that a uniform mixture has been obtained.

The coloring substances employed include any non-toxic dye material and particularly those dyes approved for coloring foods. In many cases, the coloring material may also possess an anthelmintic action such as, for example, crystal violet and brilliant green. A preferred coloring substance is crystal violet since it is readily available and relatively inexpensive. In addition to coloring substance, I can add to my cadmium-containing compositions other therapeutic agents, and especially agents having a veterinary anthelmintic effect and suitable for administration in the feed. Wetting agents, dispersing agents, gelling agents, peptising agents and similar substances for producing or maintaining uniform dispersions may also be used. The use of auxiliary substances such as bentonite, oils, fats, methyl cellulose, sodium alginate, and similar materials are especially useful for keeping the cadmium in suspension and preventing the settling out of the cadmium from the feed mixture. In certain cases, a laxative may be indicated, and accordingly I can include a laxative substance in my feed compositions. In my cadmium preparations intended for use in swine, magnesium sulfate is the preferred one.

When desired, my cadmium-containing feed compositions can be prepared in a pellet form. The commercially available poultry or domestic animal food compositions are, in general, satisfactory as carriers for the cadmium substances. In preparing the concentrates, I may use a wide variety of substances, including soy bean meal, soy bean flour, dried distiller's residue, dried whey, dried buttermilk, dried skim milk, pulverized oats, ground corn meal, wheat bran, salt, bone-meal, bone ash and similar materials.

The effectiveness of my compositions is believed to be due to the cadmium portion of the various compounds, and it is important, therefore, that the cadmium compound be dispersed uniformly throughout the poultry and/or domestic animal feed in such a manner that, when the food is consumed, an effective and uniform dose of cadmium will be obtained. Accordingly, the quantity of the various cadmium compounds employed is based on their cadmium content. In poultry feeds, my preferred concentration of cadmium falls within the approximate range of 0.005% to about 0.05%. In swine feeds, my preferred concentrations range from approximately 0.003% to 0.03% of cadmium.

The quantity of cadmium compounds used in my feed compositions described above are so very small that it is difficult for the flock or herd owner to prepare the feed mixture containing the cadmium compound evenly dispersed therein in order to provide a uniform and effective dose of the cadmium. In accordance with the present invention, I also provide an orally ingestible, non-toxic substance, which has dispersed therein, a cadmium compound in relatively high concentrations, and which concentrates are especially well adapted for mixing with poultry and/or domestic animal feeds to provide a product having the desired amount of cadmium dispersed uniformly therein. In my concentrated compositions used for producing the above diluted feeds, I prefer a concentration of from 0.5% to 10% of cadmium; however, lower concentrations of about 0.05% may be employed.

Since the anthelmintic activity of my compositions is essentially due to the cadmium portion of the various compounds employed, my invention has a considerable amount of flexibility and permits the use of a wide variety of cadmium compounds. I prefer to employ those cadmium compounds that are readily available and less expensive in as much as economy is one of the important factors affecting the usefulness of my compositions.

Thus, in the preparation of my medicated feed compositions, I prefer to use the cadmium compounds such as cadmium oxide, cadmium chloride, cadmium bromide or cadmium sulfate because of their cheapness and their availability. It is desired to emphasize, however, that I can employ any cadmium compound which can be used to provide an effective concentration of cadmium without producing a toxic effect. Among such cadmium compounds are cadmium pentachlorophenate, cadmium naphthenate, cadmium orthophenylphenate, cadmium carbonate, cadmium hydroxide, cadmium orthophosphate, cadmium silicate, cadmium chloro-ortho-phenylphenate, cadmium 2,4-dichloro-ortho-phenylphenate, cadmium acetate, cadmium ammonium fluoride, cadmium arsenate, cadmium borate, cadmium chlorophosphate, cadmium fluoride, cadmium fluosilicate, cadmium metaphosphate, cadmium nitrate, cadmium oxalate, cadmium perchloriate, cadmium phosphate, cadmium sulfide, cadmium sodium chloride, cadmium stannate, cadmium iodide, cadmium stearate, cadmium salicylate, and the like. Cadmium-containing pigments such as, for example, $ZnS \cdot CdS \cdot BaSO_4$, $CdS \cdot BaSO_4$, and $CdS \cdot CdSe \cdot BaSO_4$ may also be used, in which case, the feed compositions are colored without the addition of other coloring agents.

The following will illustrate methods for preparing my veterinary therapeutic agents.

Example 1

Fifty pounds of finely ground oats are mixed with 50 pounds of finely ground corn, and 0.05 pound of cadmium oxide is mixed with five pounds of oats and corn mixture and uniformly milled. This mixture is then dispersed in the remaining corn-oats mixture. The mixture contains about 0.04% cadmium and may be fed directly to poultry or domestic animals, or it may be mixed with feed to produce a more diluted product, i. e., one pound of mixture added to four pounds of feed gives a cadmium oxide concentration of 0.01%.

Example 2

An aqueous solution containing one pound of cadmium chloride is intimately mixed with ten pounds of a commercial poultry mash feed and the mixture dried. This feed mash is then mixed with sufficient dry poultry mash to make a total of 100 pounds of concentrate containing about 0.5% cadmium. It can be diluted with dry poultry mash to provide any desired effective lower concentration of cadmium.

Example 3

Cadmium oxide (1.715 pounds) is mixed with one pound of a mixture of equal parts of ground corn and oats and milled until a uniform premix is formed. This premix is mixed with additional quantities of a ground corn meal and oats mixture until a total mixture of 500 pounds is obtained. The final cadmium oxide concentration of about 0.3%. One pound of this mixture added to nine pounds of a commercial hog feed gives a feed mixture containing about 0.03% cadmium oxide.

Example 4

Cadmium oxide (11.24 pounds) is mixed with ten pounds of powdered charcoal and milled until a uniform mixture is obtained. This cadmium oxide-charcoal mixture is mixed with a mixture of finely ground corn and oats to produce a total of 100 pounds of the final mix. The cadmium concentration of the final mix is approximately 10%. This concentrate can be further diluted to give concentrates containing from 0.5% to 5% cadmium. Dilutions with the appropriate quantity of poultry feed can be made to provide cadmium concentrations of from 0.05% to 0.005%, or diluted with hog feed to provide cadmium concentrations of from 0.03% to 0.003%.

Example 5

Cadmium oxide (1.12 pounds) is mixed with five pounds of iron oxide and thoroughly milled. This colored premix is then mixed with enough ground corn and oats mixture to provide a total weight of 100 pounds. The final mixture contains approximately 1% cadmium. One pound of this mixture, when mixed with 99 pounds of a poultry or swine feed, will give a feed having about 0.01% cadmium.

Example 6

Ten pounds of cadmium chloride are dissolved in one gallon of water and sprayed onto 90 pounds of a mixture of equal parts of ground corn and oats. The wetted mixture is thoroughly milled and then dried with a blast of warm air. The dried mixture contains approximately 5% cadmium. When about one pound of this mixture is mixed with 99 pounds of a commercial horse feed, a feed containing about 0.05% cadmium is produced.

Example 7

About two pounds of cadmium chloride are mixed with about two pounds of ground oats and thoroughly mixed with two pounds of alfalfa meal. This premix is then mixed with further additional quantities of ground oats until a total of 100 pounds of mixture is produced, containing approximately 1% cadmium. One pound of this mixture dispersed in enough commercial horse feed to provide 100 pounds gives a horse feed containing 0.01% cadmium.

Example 8

A solution of 0.2 mole of NaOH in 50 cc. water was added to a solution of 0.2 mole of a dichlorophenol compound (53.8 g.) in 50 cc. acetone. To this was added with stirring, a solution of 0.1 mole of cadmium chloride (22.8 g.). A milky precipitate formed. Stirring was continued for ½ hour. The precipitate was filtered and washed with water until washings were neutral. The dried material contained about 17.35% cadmium.

One pound of this cadmium product mixed with 99 pounds of ground hog feed gives a feed containing about 0.17% cadmium, or with 999 pounds of feed, it gives a feed containing a cadmium concentration of about 0.017%.

Example 9

One pound of cadmium oxide is thoroughly mixed with ten pounds of sodium fluoride. This cadmium oxide-sodium fluoride mixture is then mixed with 89 pounds of a mixture of about equal parts of ground corn and oats. One pound of this mixture when dispersed in 99 pounds of a commercial hog feed will give a feed containing about 0.01% cadmium oxide and about 1% sodium fluoride.

Example 10

Cadmium oxide, one pound, is mixed thoroughly with ten pounds of phenothiazine. This 11 pounds of mixture is then dispersed in 89 pounds of a mixture of equal parts of ground corn and oats.

One pound of this mixture, when dispersed in 99 pounds of a commercial poultry mash will give a feed containing about 0.01% cadmium oxide and about 1% phenothiazine.

Example 11

Two grams of cadmium oxide, two grams of phenothiazine, 50 mg. of riboflavin, and 1000 units of vitamin D irradiated yeast are mixed with sufficient horse feed to make about two pounds.

Example 12

Three to six per cent of cadmium oxide, four to six per cent of nicotine alkaloid (as a salt), and 40 to 60 percent phenothiazine and fuller's earth or colloidal clay to make 100 per cent are mixed together to provide a poultry worming product.

Example 13

Cadmium oxide, two pounds, are thoroughly mixed with five pounds of prussian blue. This colored powdered mixture is then thoroughly mixed with sufficient bone ash to make 100 pounds. This colored, orally ingestible cadmium containing concentrate can be mixed with one part in 100 parts of a poultry mash or domestic animal feed to provide a feed composition containing about 0.02% cadmium oxide or about 0.017% cadmium.

Example 14

Two parts of methylene blue are dissolved in a convenient volume of water and thoroughly mixed with a mixture comprising one part cadmium oxide and 97 parts of bone ash. The mixture, when dry, contains a concentration of about 1% cadmium oxide and can be mixed with commercially available ground feed substances to produce an anthelmintic feed mixture containing the desired dilution of cadmium, i. e., one part mixed with 99 parts of feed will provide a composition containing about 0.01% cadmium oxide.

Example 15

Four parts of orange No. 4 DC are dissolved in a convenient volume of water and thoroughly mixed with a mixture comprising two parts cadmium oxide and 94 parts of bone ash. The mixture, when dry, contains a concentration of about 2% cadmium oxide and can be mixed with commercially available ground feed substances to produce an anthelmintic feed mixture containing the desired dilution of cadmium.

Example 16

Crystal violet (one part) is dissolved in a convenient volume of isopropanol and thoroughly mixed with a mixture comprising two parts cadmium oxide and 97 parts of bone ash. The mixture, when dry, contains a concentration of about 2% cadmium oxide and can be mixed with commercially available ground feed substances to produce an anthelmintic feed mixture containing the desired dilution of cadmium.

Example 17

Crystal violet (0.5 part) is dissolved in a convenient volume of isopropanol and thoroughly mixed with a mixture comprising one part cadmium oxide and 98.5 parts bone ash. The mixture when dry contains a concentration of about one percent cadmium oxide and can be mixed with commercially available ground feed substances to produce an anthelmintic feed mixture containing the desired dilution of cadmium.

Example 18

Four parts of potassium dichromate are dissolved in a convenient volume of water and thoroughly mixed with a mixture comprising two parts cadmium oxide and 94 parts bone ash. The mixture when dry contains a concentration of about two per cent cadmium oxide and can be mixed with commercially available ground feed substances to produce an anthelmintic feed mixture containing the desired dilution of cadmium.

Example 19

One part of crystal violet is dissolved in a convenient volume of isopropanol and thoroughly mixed with a mixture comprising one part cadmium oxide and 98 parts salt. The mixture when dry contains a concentration of about one per cent cadmium oxide and can be mixed with commercially available ground feed substances to produce an anthelmintic feed mixture containing the desired dilution of cadmium.

Example 20

Two pounds of cadmium oxide are thoroughly mixed with four pounds of Jeweller's rouge. This colored powdered mixture is then thoroughly mixed with sufficient salt to make 100 pounds. This colored orally ingestible cadmium containing concentrate can be mixed with one part in 100 parts of a poultry mash or domestic animal feed to provide a feed composition containing about 0.02% cadmium oxide.

Example 21

Cadmium oxide, two pounds, are thoroughly mixed with four pounds of yellow oxide or iron. This colored powder mixture is then thoroughly mixed with sufficient salt to make 100 pounds. This colored orally ingestible cadmium containing concentrate can be mixed with two parts in 100 parts of a poultry mash or domestic animal feed to provide a feed composition containing about 0.04% cadmium oxide.

In the foregoing examples, the particular cadmium compounds employed may be replaced by an equivalent quantity of any one or combination of the cadmium compounds mentioned previously as being suitable for use in my veterinary therapeutic feed compositions.

Similarly, the cadmium concentration can be varied to fit a particular situation. In general, the diluted feeds for direct consumption preferably contain from about 0.003% to 0.05% cadmium. The concentrates may be varied from about 0.05% to 10%, but the most convenient ones range from about 0.5% to 5% cadmium.

Young poultry are particularly susceptible to large roundworm infections and the infected birds develop slowly, making uneconomic gains compared to their feed consumption. It appears that most fowl, including chickens, turkeys, pheasants, guinea fowl, ducks and geese, are all susceptible to large roundworm infections. Among the common species of roundworms infecting poultry are *Ascaridia galli*, *Ascaridia columbae*, *Ascaridia numidae*, and *Ascaridia dissimilis*.

In addition to large roundworm infections, poultry are subject to infections with tapeworms and cecal worms. Tapeworm and cecal worm infections have been controlled by mixing phenothiazine and nicotine-containing preparations with the poultry feed. I have discovered that phenothiazine and the nicotine-containing preparations can be added to my cadmium-containing poultry feed compositions and that the resulting compositions are effective for the control of all three of these intestinal parasitic infections of poultry. It was surprising to find that the addition of my cadmium-containing compositions to the phenothiazine and nicotine-containing preparations did not increase the toxicity of the feed for the poultry. It was gratifying to find, however, that feeding the mixture to poultry for a period of two or three days was effective for the control of roundworm, cecal worm and tapeworm infections. In addition to combining my cadmium-containing feed compositions with the two specific poultry anthelmintic substances mentioned above, it is contemplated that anthelmintic substances effective against cecal worms and/or tapeworms of chickens are suitable for addition to my cadmium-containing poultry feeds.

As pointed out above, my veterinary therapeutic agents for the control of roundworm infections of poultry include orally ingestible, non-toxic poultry feed substances having intimately dispersed therein a cadmium compound in sufficient quantity to provide a cadmium concentration of from about 0.005% to 0.05%. When the higher concentrations of from about 0.02% to 0.05% are employed, it is usually only necessary to keep the poultry on the medicated mash for one or two days. When the lower concentrations of from 0.005% to 0.01% are employed, it is usually desirable to feed the medicated mash for from three to four days or more. In general practice, it is usually desirable to feed my medicated poultry feed to the birds at about five or six weeks of age and repeat the treatment at three or four week intervals as indicated.

My feed compositions do not appear to produce an immediate anthelmintic action and the treated swine or poultry do not pass dead roundworms in their feces until three or more days following the first days' treatment and may continue dead parasite passage for several days.

The cadmium concentrations in my swine feed mixtures have been varied from 0.003% to about 0.1%. The manner in which these feed compositions are employed for the treatment of large roundworm infections of swine differs somewhat, depending on the concentration of cadmium. In the lower concentrations, i. e., from about 0.003% to 0.01%, the feed is fed to infected hogs for a period of from two, three, or four days. When indicated, the treatment should be repeated in about three or four weeks. In the higher concentrations, i. e., when the cadmium is in a concentration from about 0.02% to 0.1%, the infected hogs are kept on the feed for only one or, perhaps, two days.

In the feed compositions containing the higher percentage of cadmium, the swine, after eating some of the medicated feed may vomit in three or less hours, but, apparently, enough of the cadmium will be retained to produce an anthelmintic effect against the roundworms. The fact that emesis occurs lessens the likelihood of toxic amounts being absorbed by the swine. When my feed compositions containing the lower percentages of cadmium are employed, the hogs eat the feed in a normal manner and there are no signs of toxic effects on the swine, but, apparently, the cadmium has a cumulative toxic effect against the large roundworms since dead parasites are passed in the feces beginning about the third day after starting to eat the medicated feed and dead parasites may be passed for several days after discontinuing the medicated feed.

In the past few years, sodium fluoride has been extensively employed for the treatment of large roundworm infections in swine and is generally employed in the feed in about a 1% level. When desired, my cadmium-containing swine feed may be used in conjunction with sodium fluoride for the control of large roundworm infections. The sodium fluoride may be maintained at the 1% level in the feed, or in some cases a 0.5% level can be used in conjunction with from about a 0.003% to 0.03% level of cadmium in the feed and good results obtained.

While the concentrated cadmium containing compositions described are primarily adapted for preparing diluted cadmium containing feed products, they may, however, if desired, be administered directly to poultry or domestic animals to control roundworm infections. For example, 55 grams of the product of Example 4 can be administered to an 800 pound horse to provide a dose of cadmium equivalent to about 25 mg./kg., and the dose repeated as necessary. Or five grams of the product of Example 4 can be placed in gelatin capsules and administered to a 50 pound pig to provide a dose of cadmium equivalent 25 mg./kg. Or 0.5 gram of the product of Example 13 can be placed in a gelatin capsule and administered to a two to three pound chicken to provide a dose of cadmium equivalent to about 30 mg./kg. plus a dose of phenothiazine and nicotine sulfate.

In accordance with the foregoing, it is seen that I have provided a roundworm control composition for controlling large roundworm infections in meat-producing animals comprising a grain-based feed for said animals containing a cadmium compound in a quantity sufficient to provide a cadmium concentration of at least 0.003%, based on the weight of the feed, and not more than 0.1%. I have also provided a process for killing large roundworms in domestic meat-producing animals infected therewith which comprises contacting the roundworms with a cadmium compound by feeding said animals over a period of at least 24 hours, but not over a period sufficient to produce serious toxic effects to the animals, a domestic animal feed containing a cadmium compound in a quantity to provide a cadmium concentration of at least 0.003% based on the weight of the feed.

I claim:

1. A roundworm control composition for controlling large roundworm infections in meat producing animals comprising a grain-based feed for said animals containing a cadmium compound in a quantity sufficient to provide a cadmium concentration of at least 0.003%, based on the weight of the feed, and not more than 0.1%.

2. A composition for controlling large roundworm infections in swine comprising a grain-based swine feed containing a cadmium compound in a quantity to provide a cadmium concentration of from about 0.003% to about 0.04%.

3. A composition for controlling large roundworm infections in swine comprising a grain-based swine feed containing cadmium oxide in a quantity to provide a cadmium concentration of from about 0.003% to about 0.04%.

4. A composition for controlling large roundworm infections in swine comprising a grain-based swine feed containing cadmium chloride in a quantity to provide a cadmium concentration of from about 0.003% to about 0.04%.

5. A composition for controlling large roundworm infections in swine comprising a grain-based swine feed containing cadmium oxide in a quantity to provide a cadmium concentration of about 0.015%.

6. A composition for controlling large roundworm infections in swine comprising a grain-based swine feed containing cadmium chloride in a quantity to provide a cadmium concentration of about 0.015%.

7. A process for killing large roundworms in domestic meat-producing animals infected therewith which comprises contacting the roundworms with a cadmium compound by feeding said animals over a period of at least 24 hours, but not over a period sufficient to produce serious toxic effects to the animals, a domestic animal feed containing a cadmium compound in a quantity to provide a cadmium concentration of at least 0.003% based on the weight of the feed.

8. A process for killing large roundworms in swine infected therewith which comprises contacting the roundworms with cadmium oxide by feeding said swine over a period of at least 24 hours, but not over a period sufficient to produce serious toxic effects to the swine, a swine feed containing cadmium oxide in a quantity to provide a cadmium concentration of from about 0.003% to about 0.04%.

9. A process for killing large roundworms in swine infected therewith which comprises contacting the roundworms with a cadmium compound by feeding said swine over a period of at least 24 hours, but not over a period sufficient to produce serious toxic effects to the swine, a swine feed containing a cadmium compound in a quantity to provide a cadmium concentration of about 0.015%.

10. A process for killing large roundworms in swine infected therewith which comprises contacting the roundworms with cadmium oxide by feeding said swine over a period of at least 24 hours, but not over a period sufficient to produce serious toxic effects to the swine, a swine feed containing cadmium oxide in a quantity to provide a cadmium concentration of about 0.015%.

References Cited in the file of this patent

U. S. Dispensatory, 24th Ed. (1947), p. 1377.
Merck Index, 6th Ed. (1952), p. 179.
Manufacturing Chemist, vol. 21, April 1950, pp. 155 to 158.
Wilson—Jour. of Pharmacology and Experimental Therapeutics, vol. 71, 1941, pp. 222 to 235 (pp. 222 to 223 relied upon).
Seiden—Manufacturing Chemist, vol. 21, No. 7, July 1950, pp. 279 to 283.
U. S. Dispensatory, 21st Ed. (1926), Lippincott Co., pp. 1235 and 1236.
Sollmann—Manual of Pharmacology, 7th Ed., 1948, Saunders Co., Phila., Pa., p. 955.